A. S. DENNIS.
CALCULATING MACHINE.
APPLICATION FILED OCT. 31, 1910.
1,114,593.
Patented Oct. 20, 1914.
3 SHEETS—SHEET 1.
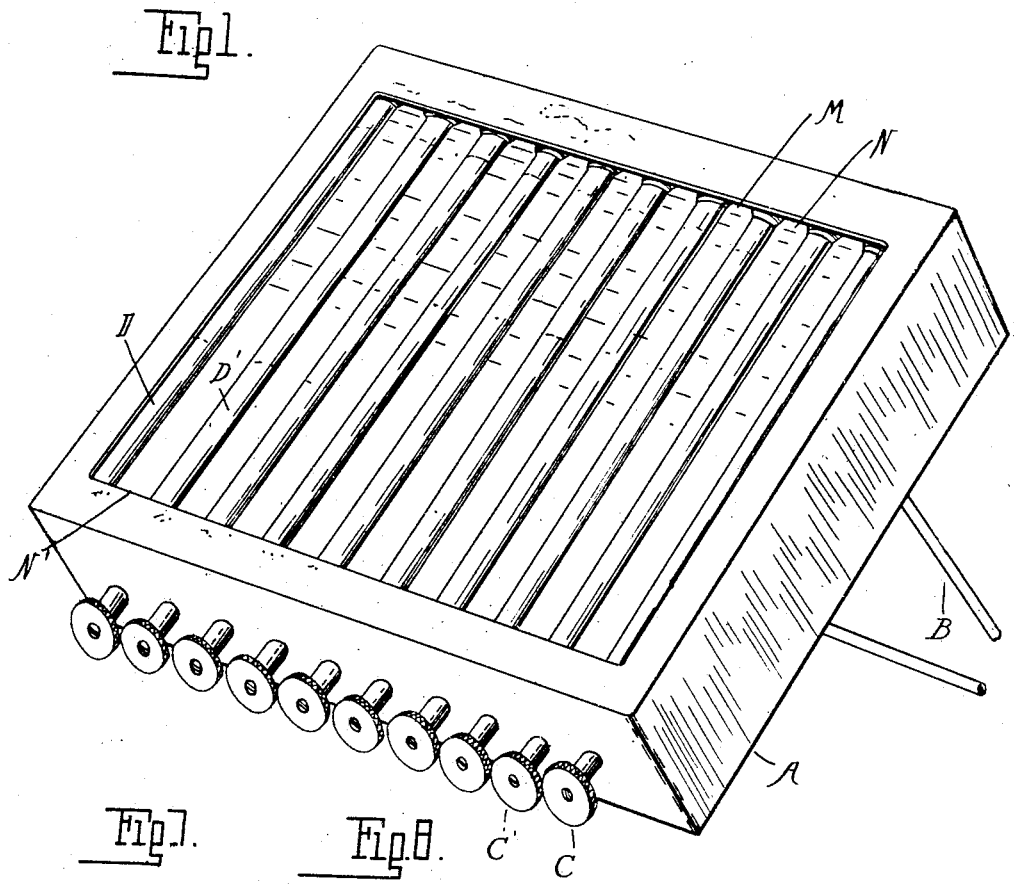
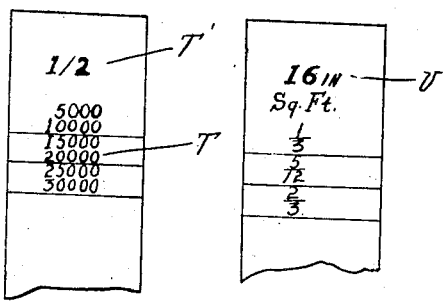
Witnesses
H. L. Ford
James P. Barry
Inventor
Adolphus S. Dennis
By
Attorneys A. S. DENNIS.
CALCULATING MACHINE.
APPLICATION FILED OCT. 31, 1910.
1,114,593.
Patented Oct. 20, 1914.
3 SHEETS—SHEET 2.
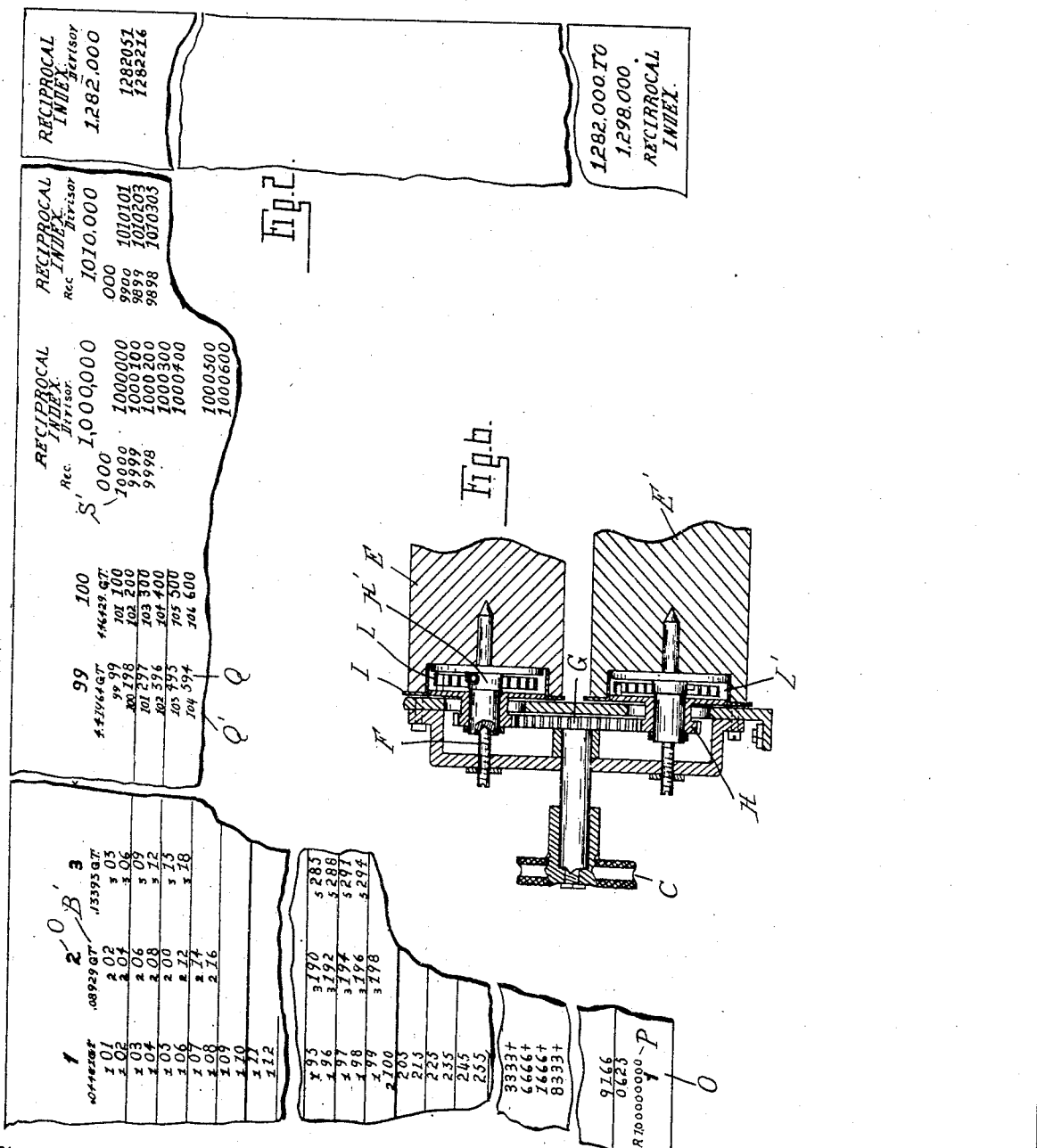

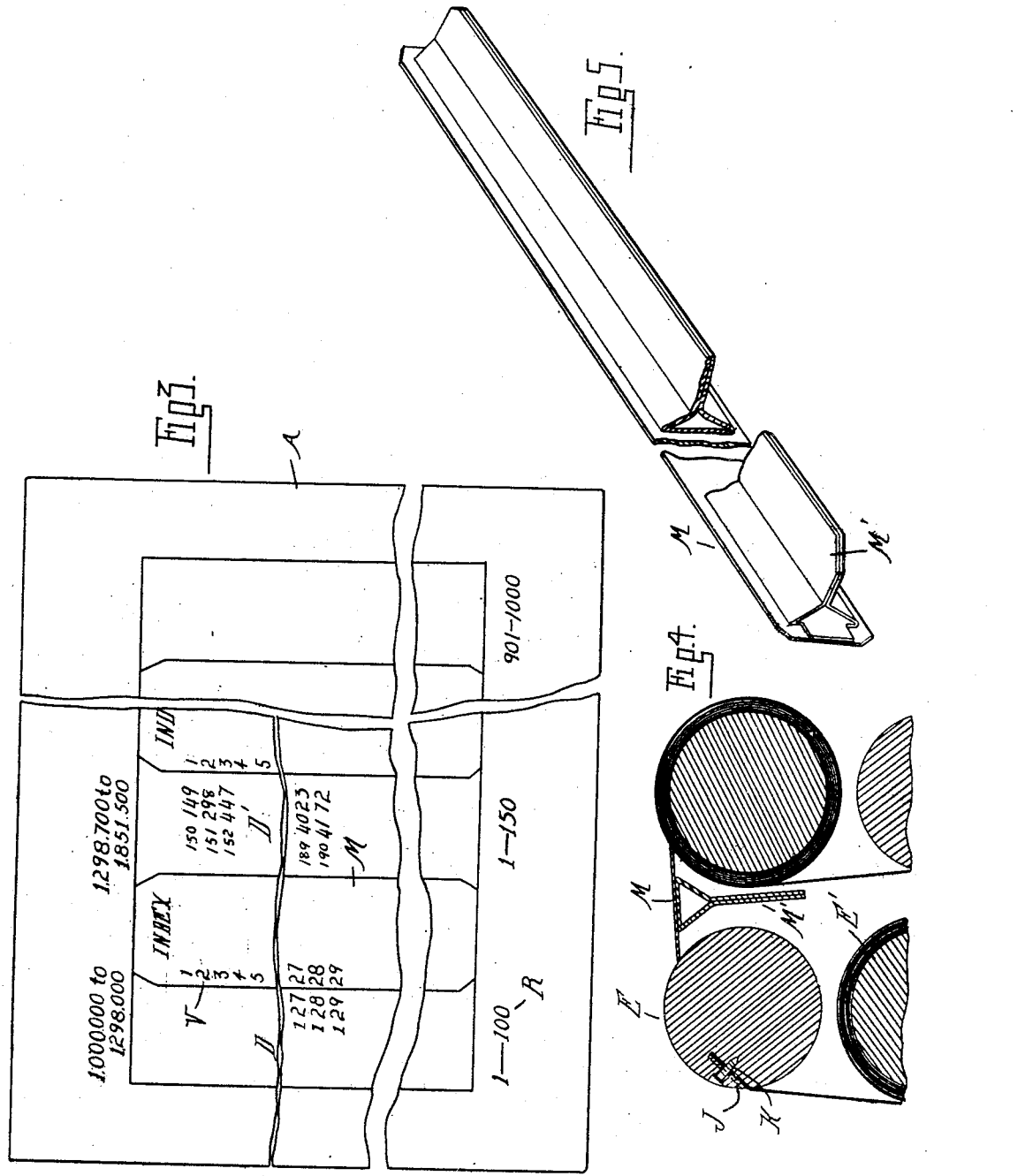

UNITED STATES PATENT OFFICE.

ADOLPHUS S. DENNIS, OF LAKEWOOD, OHIO, ASSIGNOR TO THE JAMES J. HINDE COMPANY, OF CLEVELAND, OHIO, A CORPORATION OF OHIO.

CALCULATING-MACHINE.

1,114,593.     Specification of Letters Patent.     Patented Oct. 20, 1914.

Application filed October 31, 1910. Serial No. 590,013.

*To all whom it may concern:*

Be it known that I, ADOLPHUS S. DENNIS, a citizen of the United States of America, residing at Lakewood, in the county of Cuyahoga and State of Ohio, have invented certain new and useful Improvements in Calculating-Machines, of which the following is a specification, reference being had therein to the accompanying drawings.

The invention relates to computing machines of that type in which a plurality of independently-adjustable charts, each carrying a series of computations are arranged for operation either separately or in conjunction. The adjustment of the charts is effected by winding them from one roll to another, each chart being provided with a set of rolls and the computations on the chart being exhibited in adjacence to index strips upon which factors of the computations are placed. The index strips have arranged thereon, a series of consecutive numbers, as for example the series 1 to 100, while the charts are provided with a series of consecutive numbers extending in the direction of their adjustment and in line with each of said numbers, a series of computations corresponding to the products of the said number and each of the numbers in the index. Thus, by suitable adjustment of the chart any desired computation within the limits of the instrument may be quickly obtained.

It is an object of the present invention to greatly extend the range of work possible with the machine without materially increasing the dimensions of the case or the size of the charts employed.

It is a further object to obtain a mechanical construction which facilitates the rapid adjustment of the charts to exhibit the desired computation and also maintain the index strip in proximity to the chart in all positions of adjustment thereof.

Still further, it is an object to provide charts with additional selected data which may be used for other calculations than those effected by the main series, without interference with the latter and without complication of the mechanical construction of the machine.

With these objects in view the invention consists, first, in the novel construction and arrangement of the coöperating mechanical parts; second, in the arrangement in proximity to the computations of substitute computations, complementary to main computations to extend the range thereof; third, in imparting to the auxiliary partial computations a distinctive character so as to avoid confusing with the main computations; fourth, in the peculiar construction and arrangement of the index strip; and, fifth, in the arrangement of the selected data other than the main computations upon the several charts of the machine.

In the drawings,—Figure 1 is a perspective view of the machine complete; Fig. 2 is an elevation of a portion of one of the charts and the index therefor illustrating the arrangement of the main and substitute computations; Fig. 3 is a diagram of the chart of the machine showing the general arrangement of the auxiliary data thereon; Fig. 4 is a cross section through the machine; Fig. 5 is a perspective view of one of the index strips; Fig. 6 is a longitudinal section through the axial plane of a pair of rolls showing the compensating mechanism therefor. Fig. 7 is an elevation of a portion of one of the charts showing the selected data based on a fractional head numeral; Fig. 8 is an elevation of a portion of one of the charts showing the selected data based on width of lumber.

In the present state of the art, machines of the type above referred to have been constructed comprising a plurality of charts wound upon pairs of rolls arranged adjacent to each other and having index strips therebetween. Upon the charts are longitudinally extending parallel series of computations in transverse alinement with a head series of numerals which forms factors thereof. The index strips are also provided with consecutive series of numerals registering respectively with the computations in the parallel series on the chart and constituting the other factors of the computations. The arrangement is such that the successive charts bear the computations forming complementary portions of one series, as for instance, the first chart may contain the head numerals and computations thereof of the series 1 to 100, the second chart of the series 101 to 200 and so on. Thus in use the operator may quickly select any desired computation within the range of the instrument by adjusting the proper chart containing one factor of the computation in its head numerals, and when this number is in view selecting the other factor from the series of numerals on the index strip and taking a reading of the computation adjacent thereto. It is obvious, however, that the range of work with such machines is limited as it is scarcely possible to conveniently arrange, within practical space limits, a series of numerals on the index strip greater than from 1 to 100. This limits the range to multiplications having one factor thereof containing only two figures but the other factor may be three figures if a suitable number of adjacent complementary charts are placed within the instrument.

It is one of the features of the present invention to extend the calculations to include three or more figures in the index series. This is effected by placing adjacent to each transverse series of computations on the chart, a series of substitute computations based on the same head numeral but with three figures in the other factor, the first two from the right being those on the index strip while the third or figure to the left is the numeral 1. Inasmuch, however, as the computations based on this enlarged factor all contain two or more figures to the right which are the same as the computations based on the numeral on the index series, it is unnecessary to place the complete product in the substitute column, instead only the additional or changed figures are printed therein and these are read with figures in the main computations to give the complete product. Thus a great deal of valuable space on the chart is saved by the use of the partial computations and what is still more important, the width of the observation opening is less than would be required for two complete series of computations, and the total width of the machine is correspondingly reduced.

Another feature of my improved construction by which the range of the instrument is increased is by placing on the chart, adjacent to each head or index numeral, the reciprocal thereof. This facilitates calculations in division which as well as multiplication may be made upon the instrument. Still further the usefulness of the machine is extended by placing upon the charts a reciprocal index series in which consecutive numerals with their reciprocals are placed adjacent to each other. This reciprocal index is preferably distributed over a number of the charts in the instrument so as not to unduly extend any one, and at the same time to obtain a relatively large range. In addition to the reciprocal index the charts needed for the main series of computations will afford space for other valuable data for use in computations, as for instance, the decimal equivalents of the common fractions, particularly those forming divisions of measurement in the commonly used tables of weights and measures. Computations based on these fractions and the numerals in the index series are also placed on the chart, and other data that will be more specifically referred to hereinafter.

In the mechanical construction of my improved instrument, A is the case which is preferably substantially rectangular in form and is preferably provided with means of support by which the face is arranged in an oblique plane. Thus as shown, the case A is provided with a folding bail or leg B which raises the outer end of the case and permits it to assume an inclined position with the lower end adjacent to the user.

C C', etc., are series of operating knobs or hand-wheels at the lower end of the case A which are used for adjusting the several charts therein.

The charts D, D', etc., are wound upon pairs of rolls E having their axes in parallel alinement and in a plane transverse to the face of the case. These rolls are preferably mounted at opposite ends on point bearings F which permit them to turn with little frictional resistance. They are also driven from their corresponding knobs or hand-wheels through the medium of a master gear wheel G on the shaft of said hand-wheel and meshing with pinions H on the shafts of the rolls. The pinions are preferably considerably smaller than the master gear wheel so as to step up the speed of rotation of the chart and expedite the operation of adjustment. To guide the charts upon the rolls, flanges I are arranged at opposite ends which are of greater diameter than the coil when the chart is completely wound on one of the rolls. It is important to attach the chart of the roll in such a manner as to relieve it from a localized stress at the point of attachment which might result in tearing of the paper. This I accomplish by forming a slit in the roll which is oblique to the radial line and as closely approximating a tangential arrangement as possible while still leaving segments on both sides of the slit. In this slit the end of the paper strip is placed and adjacent to it an insert J of fiber having a rounded edge which will not cut the paper in contact therewith.

K are screws or other fastening devices for clamping the segments together upon the paper and insert J. To compensate for the changing diameter of the rolls which would cause the strip to travel faster upon one than the other, I provide a yieldable connection between the roll and its drive shaft or axle. As shown, this consists in a spring L within a recess L' in the end of each roll, one end of said spring being attached to the roll and the other end to the shaft or axle H' on which the pinion H is mounted. Thus, if the speed of the paper is greater or less than the peripheral speed of the roll when traveling at the same angular speed as the shaft, the spring L will yield permitting a relative movement of the shaft and roll so as to equalize the peripheral speed of the latter to that of the paper.

M are the index strips arranged between the rolls for adjacent charts. These strips are of a width sufficient to accommodate the columns of figures thereon and overlapping the adjacent rolls being held in a position to always register the numerals thereon with the corresponding computations on the charts. The diameter of the chart rolls adjacent to which the strips M are arranged will vary according to the amount of the chart which is reeled thereon, and consequently if the index strip is fixed in position sufficient clearance space must be left for the largest diameter of roll, which will result in leaving a space or gap between the index figures and the computations when the chart is wound on the other roll of the pair. To avoid such a result which interferes with the ease in taking a reading, I have constructed an adjustable index strip which is automatically maintained with its edge in contact with the chart without regard to the position of said chart on the roll. As shown, the strip M is provided on its under side with a bracing strip M' for holding it at all times straight, while the end of the strip is guided between flanges N and N' at the upper and lower ends of the case. There is not, however, any positive attachment between the strip and the case and on account of the position the strip will rest upon the rolls and will be moved thereby to adjust itself to the different positions of the chart. In all such movement the registration of the figures on the strip with the computations on the chart is accurately maintained.

The charts which are used in the machine are formed with parallel longitudinally extending series of computations, with a series of head or index numerals preferably at both edges of the sheet. These head or index numerals O are preferably printed in large type to quickly catch the eye, and adjacent thereto at one end of the roll is printed in small type the reciprocal of the numeral P and at the other end of the roll some other number having a definite relation thereto such as B' which as shown is the gross tonnage. Intermediate the head or index numerals on opposite edges of the sheet is a transverse row of figures Q constituting members of the parallel series of computations and all being products of the head numeral as one factor. Adjacent to the row of figures Q is a second row of figures Q' printed in distinctive characters, as for instance if the first row is printed in common numerals the second may be printed in italics. This will permit of placing the two rows together without any intermediate spacing and still avoid confusion.

The machine is preferably constructed with ten or more charts which together include computations of the series from 1 to 1,000. This if equally divided would place the computations of 100 figures upon each roll, but it may be found convenient to distribute the series unequally between the charts to afford greater space on some for additional data. However, the range of each chart is clearly indicated by index nunumerals R printed adjacent thereto on the case. Upon several of the charts, for instance upon the first four from the left may be placed a series of consecutive numerals and their reciprocals. As shown, this series includes a series of dividends S from 1,000,000 to 10,000,000, while the reciprocals S' of said numbers range from 10,000 to 1,001. The exact limit of the series is not however essential to the invention, nor is the exact arrangement and distribution on the charts, but as shown the several portions of the series are placed upon the charts to the left following after the portions of the main series of computations.

Upon one of the charts as shown in Fig. 7, is placed a series of computations T based on fractional head numerals T', as for instance the common fractions $\frac{1}{2}, \frac{1}{3}, \frac{2}{3}, \frac{1}{4}, \frac{3}{4}, \frac{1}{6}, \frac{5}{6}$, etc. Upon another roll shown in Fig. 8 is placed in addition to the main computations, computations in square feet based on different widths of lumber which are indicated by the head numerals U. Each of the succeeding charts is provided with additional data, but as the character of this is varied according to the particular use to which the machine is placed and is not essential to the invention further description thereof will be omitted.

In use, all multiplications involving but two figures in the multiplier and not more than three in the multiplicand can be performed by first selecting the proper chart for containing the figure of the multiplicand by means of the index on the case. This chart is then adjusted to bring the particular figure in view after which the user selects the multiplier from the series of figures V on the index strip and takes a reading of the product in registration therewith. If in place of two figures in the multiplier this is to be increased by 100, as for instance 127, the numeral 27 on the index series is selected and a reading taken from the substitute column in italics combined with a part of the figures in the main computations. Thus, if the multiplier is 127 as above indicated and the multiplicand is 149, there will be found in the substitute column in italics the figures 189, while in the main column are the figures 9423. The desired product contains all of the figures in italics combined with the first two figures from the right in the main column and therefore reads 4023. Thus by observing the rule of discarding all but two of the figures at the right in the main column and using all of the figures in the substitute column, the correct reading, 18,923, may be taken as easily as if the entire substitute product were printed. At the same time the omission of two figures in the substitute column decreases the width of observation opening necessary, and materially diminishes the length of chart needed for the entire series.

Where it is desired to use the other data placed upon the charts in the performance of any calculation, access to this may be obtained by quickly winding the first portion of the chart containing the main computations beyond which the special data is placed. The step up gearing between the operating handles and the rolls will greatly expedite this adjustment while the point bearings eliminate friction so that the operation is easily performed.

One specific use of the additional data upon the charts is where it is desired to obtain the reciprocal of a number for use in the calculation. The reciprocal index, as has been explained, is preferably distributed over a number of the rolls but the portion of the series on each roll is indicated by a suitable index on the case of the machine. Thus, by referring to this index the proper chart is selected, the corresponding knob is turned to rapidly roll all the main computations on the chart beyond which will be found the reciprocal index, and the particular number can then be readily obtained. As shown, four point reciprocals are placed in this index but variations may be made according to the particular uses for which the machines are designed.

It will be observed that the arrangement of the index strips intermediate the charts is such that the exposed portion of the roll projects beyond the plane of the index. This prevents the shadowing of the roll which might occur if the indexes were differently arranged and facilitates the reading.

What I claim as my invention is:

1. In a computing machine, the combination with a chart having a parallel series of computations thereon, of a roll on which said chart is wound, flanges on said roll forming guides for the edges of said charts, and an index bearing a series of numerals upon which said computations are based and with which they are registrable, said index being freely movable to compensate for varying diameters of said roll and being held in constant registration with the series of computations thereon.

2. In a computing machine, the combination with a chart having parallel series of computations thereon, of an index bearing numerals upon which said computations are based and with which they are registrable, and means for supporting said index and holding the same in constant registration with said series of computations while permitting free movement toward and from the axis of said roll to compensate for varying diameters.

3. In a computing machine, the combination with a plurality of charts, of adjacent rolls upon which said charts are wound and which are separately adjustable, and an index intermediate said rolls automatically adjustable to the varying diameters thereof.

4. In a computing machine, the combination with a plurality of charts, of adjacent rolls on which said charts are separately wound, an index between said rolls, and overlapping segments thereof being freely movable toward and from the axis of said rolls to compensate for varying diameters, and guides at the ends of said indexes to hold the same in registration with said charts.

5. In a computing machine, the combination with a case having a transparent face, a plurality of rolls exposed beneath said transparent face, charts separately wound upon said rolls and independently adjustable, and index strips intermediate said rolls resting in contact with the charts thereon and freely adjustable to compensate for varying diameters.

6. In a computing machine, the combination of a series of charts, rolls upon which said charts are separately wound and which are independently adjustable, index strips between said rolls resting upon said charts, and guiding means for said index strips to maintain a fixed registration with said rolls while permitting freedom of movement to compensate for varying diameters.

7. In a computing machine, the combination with a plurality of charts of adjacent rolls upon which said charts are wound, and which are independently adjustable, and an index intermediate said rolls, automatically, freely adjustable to compensate for any increase or decrease in the diameter of the bearing rolls from the minimum diameter to the maximum diameter thereof.

8. In a computing machine having a chart arranged to be wound upon and unwound from a roll and bearing indicia, a floating index coöperating with the indicia of the chart, and so mounted as to accommodate itself to the varying diameter of the roll as the chart is wound or unwound.

In testimony whereof I affix my signature in presence of two witnesses.

ADOLPHUS S. DENNIS.

Witnesses:
 A. S. WOODWARD,
 ESTHER J. TARRELL.

Copies of this patent may be obtained for five cents each, by addressing the "Commissioner of Patents, Washington, D. C."